United States Patent
Auerbach et al.

(10) Patent No.: US 11,632,264 B2
(45) Date of Patent: *Apr. 18, 2023

(54) METHOD AND SYSTEM FOR VIRTUALIZING A PLURALITY OF CONTROLLER AREA NETWORK BUS UNITS COMMUNICATIVELY CONNECTED TO AN AIRCRAFT

(71) Applicant: BETA AIR, LLC, South Burlington, VT (US)

(72) Inventors: Joshua E Auerbach, Waterbury Center, VT (US); Andrew Giroux, Georgia, VT (US)

(73) Assignee: BETA AIR, LLC, South Burlington, VT (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/478,195

(22) Filed: Sep. 17, 2021

(65) Prior Publication Data

US 2022/0321378 A1    Oct. 6, 2022

Related U.S. Application Data

(63) Continuation of application No. 17/218,342, filed on Mar. 31, 2021, now Pat. No. 11,196,585.

(51) Int. Cl.
*H04L 12/40* (2006.01)

(52) U.S. Cl.
CPC .. *H04L 12/40091* (2013.01); *H04L 12/40013* (2013.01); *H04L 12/40052* (2013.01); *H04L 12/40065* (2013.01); *H04L 12/40078* (2013.01); H04L 2012/4028 (2013.01); H04L 2012/40215 (2013.01)

(58) Field of Classification Search
CPC ......... H04L 12/40091; H04L 12/40013; H04L 12/40065; H04L 12/40078; H04L 12/4011; H04L 2012/40215; H04L 2012/4028

See application file for complete search history.

(56) References Cited

U.S. PATENT DOCUMENTS

| | | | | |
|---|---|---|---|---|
| 10,650,621 | B1* | 5/2020 | King | H04L 67/10 |
| 2017/0054574 | A1* | 2/2017 | Wu | H04L 12/4641 |
| 2020/0262544 | A1* | 8/2020 | Wilkens | G05D 1/0077 |

* cited by examiner

*Primary Examiner* — Luat Phung
(74) *Attorney, Agent, or Firm* — Caldwell Intellectual Property Law

(57) ABSTRACT

A system for virtualizing a plurality of controller area network bus units communicatively connected to an aircraft, the system comprising a plurality of physical controller area network bus units, each is configured to detect a measured state datum of a plurality of measured state data of the aircraft; and transmit the plurality of measured state data to at least a network switch, the at least a network switch configured to receive the plurality of measured state data from the plurality of physical controller area network bus units, generate a single transmission signal as a function of the plurality of measured state data, and transmit the single transmission signal to a computing device, and the computing device configured to receive the transmission signal originating from the at least a network switch, and bridge each virtual controller area network bus unit of the plurality of virtual controller area network bus units.

20 Claims, 7 Drawing Sheets

METHOD AND SYSTEM FOR VIRTUALIZING A PLURALITY OF CONTROLLER AREA NETWORK BUS UNITS COMMUNICATIVELY CONNECTED TO AN AIRCRAFT

CROSS-REFERENCE TO RELATED APPLICATIONS

This application is a continuation of U.S. patent application Ser. No. 17/218,342, filed on Mar. 31, 2021, entitled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated by reference herein in its entirety.

FIELD OF THE INVENTION

The present invention generally relates to the field of computer networking and multiplexing. In particular, the present invention is directed to virtualizing a plurality of controller area network bus units communicatively connected to an aircraft.

BACKGROUND

Aircraft may use many physical CAN buses for redundancy and separation of concerns. Interacting with all physical CAN buses is difficult because it requires many connectors and tapping into each bus separately.

SUMMARY OF THE DISCLOSURE

In an aspect, a system for virtualizing a plurality of controller area network bus units communicatively connected to an aircraft, the system comprising a plurality of physical controller area network bus units, wherein each physical controller area network bus unit of the plurality of physical controller area network bus units is communicatively connected to an aircraft, and wherein each physical controller area network bus unit is configured to detect a measured state datum of a plurality of measured state data of the aircraft, and transmit the plurality of measured state data to at least a network switch, the at least a network switch, wherein the at least a network switch is communicatively connected to the plurality of physical controller area network bus units, and wherein the at least a network switch is configured to receive the plurality of measured state data from the plurality of physical controller area network bus units, generate a single transmission signal as a function of the plurality of measured state data, and transmit the single transmission signal to a computing device, and the computing device, wherein the computing device comprises a plurality of virtual controller area network bus units, wherein the computing device is configured to receive the transmission signal originating from the at least a network switch, and bridge each virtual controller area network bus unit of the plurality of virtual controller area network bus units.

In another aspect, a method for virtualizing a plurality of controller area network bus units communicatively connected to an aircraft, the method comprising detecting, by a plurality of physical controller area network bus units is communicatively connected to an aircraft, a measured state datum of a plurality of measured state data of the aircraft, transmitting, by the plurality of physical controller area network bus units, the plurality of measured state data to at least a network switch, receiving, by at least a network switch, the plurality of measured state data from the plurality of physical controller area network bus units, generating, by the at least a network switch, a single transmission signal as a function of the plurality of measured state data, transmitting, by the at least a network switch, the single transmission signal to a computing device, receiving, by a computing device, wherein the computing device comprises a plurality of virtual controller area network bus units, the transmission signal originating from the at least a network switch, and bridging, by the computing device, each virtual controller area network bus unit of the plurality of virtual controller area network bus units.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for virtualizing a plurality of controller area network bus units communicatively connected to an aircraft. In an embodiment, the system includes a plurality of physical controller area network buses communicatively connected to the aircraft, wherein each physical controller area network bus is configured to detect a measured state datum of a plurality of measured state data of the aircraft. Measured state datum may include data from a plurality of flight control devices. System includes a plurality of controller area network gateways communicatively connected to the plurality of physical controller area network buses, wherein the plurality of controller area network gateways are configured to transmit the plurality of measured state data. Measured state data may be multiplexed into singular digital and/or analogue signals. System includes at least a network switch communicatively connected to the plurality of controller area network gateways configured to receive the transmitted measured state data and transmit the measured state data via a transmission signal. Transmission of measured state data may be performed using Ethernet transmission and/or radio frequency (RF) transmission. System includes at least a virtual controller area network bus unit configured to receive the transmission signal originating from the at least a network switch, wherein the at least a virtual controller area network bus unit is further configured to bridge a plurality of virtual controller area network bus units to the plurality of physical controller area network buses. Virtual controller area network bus unit may include bridging a plurality of devices which may receive and transmit control messages back to physical CAN buses located at the aircraft.

Figure 1:
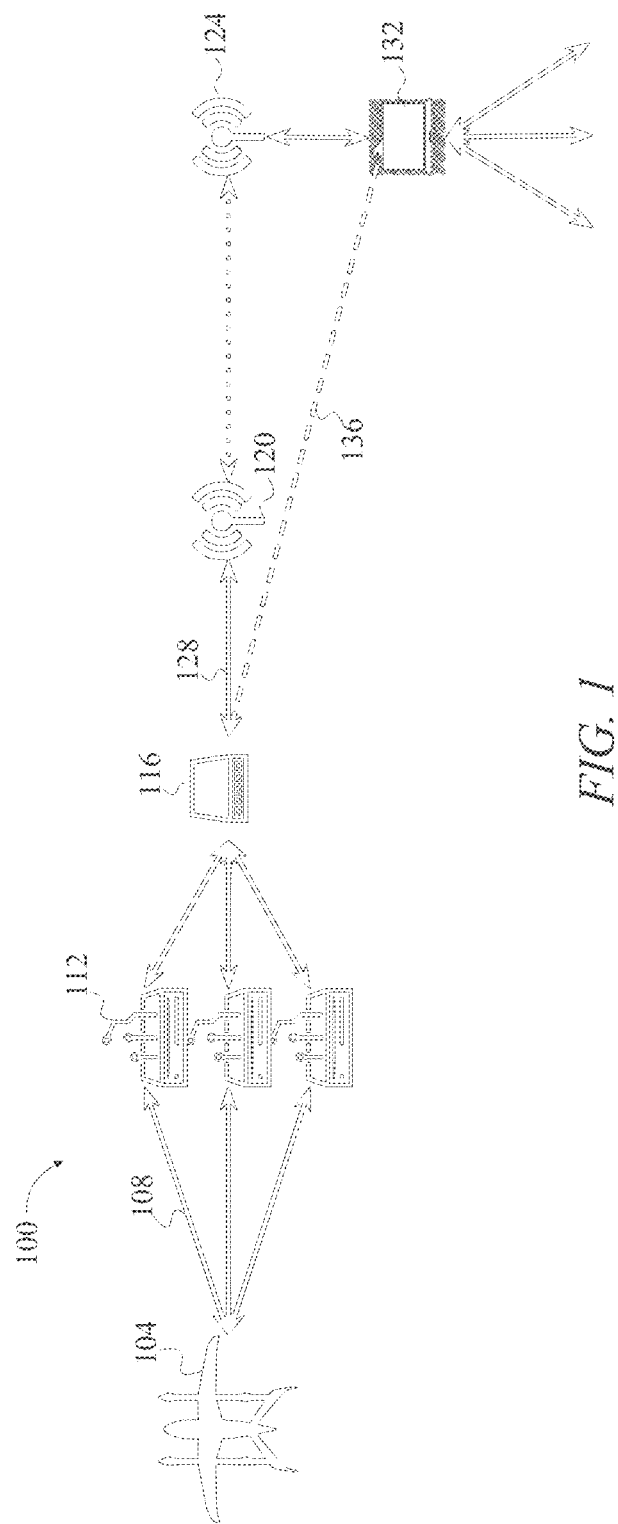
FIG. 1 is a diagrammatic representation illustrating a system for virtualizing a plurality of controller area network bus units communicatively connected to an aircraft.

Referring now to FIG. 1, a non-limiting exemplary embodiment of a system 100 for virtualizing a plurality of controller area network bus units communicatively connected to an aircraft is illustrated. System 100 may include a plurality of physical controller area network buses communicatively connected to the aircraft, such as an electronic vertical take-off and landing (eVTOL) aircraft as described in further detail below. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit 104 may include physical circuit elements that may use, for instance and without limitation, twisted pair, digital circuit elements/ FGPA, microcontroller, or the like to perform, without limitation, processing and/or signal transmission processes and/or tasks; circuit elements may be used to implement CAN bus components and/or constituent parts as described in further detail below. Physical CAN bus unit 104 may include multiplex electrical wiring for transmission of multiplexed signaling. Physical CAN bus unit 104 may include message-based protocol(s), wherein the invoking program sends a message to a process and relies on that process and its supporting infrastructure to then select and run appropriate programing. A plurality of physical CAN bus units 104 located physically at the aircraft may include mechanical connection to the aircraft, wherein the hardware of the physical CAN bus unit 104 is integrated within the infrastructure of the aircraft. Physical CAN bus units 104 may be communicatively connected to the aircraft and/or with a plurality of devices outside of the aircraft, as described in further detail below.

Still referring to FIG. 1, a plurality of physical CAN bus units 104 communicatively connected to an aircraft may include flight controller(s), battery terminals, gyroscope, accelerometer, proportional-integral-derivative controller, and the like, which may communicate directly with one another and to operating flight control devices, virtual machines, and other computing devices elsewhere. "Communicatively connected", for the purposes of this disclosure, is a process whereby one device, component, or circuit is able to receive data from and/or transmit data to another device, component, or circuit; communicative connection may be performed by wired or wireless electronic communication, either directly or by way of one or more intervening devices or components. In an embodiment, communicative connection includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, optical coupling, or the like. Physical CAN bus units 104 may be mechanically connected to each other within the aircraft wherein the physical infrastructure of the device is integrated into the aircraft for control and operation of various devices within the aircraft. Physical CAN bus unit 104 may be communicatively connected with each other and/or to one or more other devices, such as via a CAN gateway. Communicatively connecting may include direct electrical wiring, such as is done within automobiles and aircraft. Communicatively connecting may include infrastructure for receiving and/or transmitting transmission signals, such as with sending and propagating an analogue or digital signal using wired, optical, and/or wireless electromagnetic transmission medium.

Continuing in reference to FIG. 1, the plurality of physical CAN bus units 104 communicatively connected to aircraft may receive pilot input. Pilot input may include input using a throttle lever, inceptor stick, collective pitch control, steering wheel, brake pedals, pedal controls, toggles, joystick. One of ordinary skill in the art, upon receiving the benefit of this disclosure in its entirety, may appreciate the variety of pilot input controls that may be present in an electric aircraft consistent with the present disclosure. For instance and without limitation, inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. In further non-limiting illustrative examples, a collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Pilot input control 104 may be physically located within the aircraft or located remotely outside the aircraft in a second location communicatively connected to at least a portion of the aircraft.

Continuing in in reference to FIG. 1, each physical CAN bus unit 104 is configured to detect a measured state datum of a plurality of measured state data of the aircraft. A "measured state datum," as used in this disclosure, is a datum that is collected via a physical CAN bus describing some functionality about the aircraft. Measured state data 108 may include a plurality of data signals detailing a control to one or more actuators communicatively connected to the aircraft. Measured state data 108 may include a plurality of data entries relating aircraft pitch, roll, yaw, torque, angular velocity, climb, speed, performance, lift, thrust, drag, battery charge, fuel level, location, and the like. Measured state data 108 may include a plurality of data communicating the status of flight control devices such as proportional-integral-derivative controller, fly-by-wire system functionality, aircraft brakes, impeller, artificial feel devices, stick shaker, power-by-wire systems, active flow control, thrust vectoring, alerion, landing gear, battery pack, propulsor, management components, control surfaces, sensors/sensor suites, creature comforts, inceptors, throttle, collective, cyclic, yaw pedals, MFDs, PFDs, and the like.

Measured state data 108 may exist as analogue and/or digital data, originating from physical CAN bus units 104 such as bits, where a series of serial binary data are composed and transmitted relaying a measured state as indicated from a device located within, on, or communicating with aircraft.

Continuing in reference to FIG. 1, a physical CAN bus unit 104 of plurality of physical CAN bus units 104 may be communicatively connected to an actuator. An "actuator," as used in this disclosure, is a device which receives control signals in an aircraft. Actuator may be communicatively connected to physical CAN bus unit 104 in that system 100 may receive measured state data 108 from actuator functionality and/or functionality of a device controlled by actuator, such as a piston. Actuator may include a computing device or plurality of computing devices consistent with the entirety of this disclosure. Actuator may be designed and/or configured to perform any method, method step, or sequence of method steps in any embodiment described in this disclosure, in any order and with any degree of repetition. For instance, flight actuator may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Actuator may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing in reference to FIG. 1, actuator may include a piston and cylinder system configured to utilize hydraulic pressure to extend and retract a piston connected to at least a portion of electric aircraft. Actuator may include a stepper motor or server motor configured to utilize electrical energy into electromagnetic movement of a rotor in a stator. Actuator may include a system of gears connected to an electric motor configured to convert electrical energy into kinetic energy and mechanical movement through a system of gears. Actuator may include components, processors, computing devices, or the like configured to detect, as a function of time, loss of communication with flight controller. Actuator may include timer module configured to time all communication to and from actuator and in particular, to detect that flight controller has not transmitted output datum to actuator within a particular time limit, and thus, communication is likely lost. Timer module may then be configured to receive control datum directly from pilot input control. The amount of time that timer module keeps track of before switching actuator input to control datum command may be configurable to a preset time, a time of day, or a time input by another component in fall back control system 100. Actuator may be configured to receive control datum from pilot input control and receive output datum from flight controller. Actuator may be configured to move at least a portion of the electric aircraft as a function of output datum. Output datum may indicate a desired change in aircraft heading or thrust, flight controller translates control datum into output datum. That is to say, that flight controller is configured to translate a pilot input, in the form of moving an inceptor stick, for example, into electrical signals to at least an actuator that in turn, moves at least a portion of the aircraft in a way that manipulates a fluid medium, like air, to accomplish the pilot's desired maneuver. At least a portion of the aircraft that the actuator moves may be a control surface.

Still referring to FIG. 1, actuator may be configured to move control surfaces of the aircraft in one or both of its two main modes of locomotion or adjust thrust produced at any of the propulsors. These electronic signals may be translated to aircraft control surfaces. These control surfaces, in conjunction with forces induced by environment and propulsion systems, are configured to move the aircraft through a fluid medium, an example of which is air. A "control surface," as used in this disclosure, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, or any combinations thereof, and/or any other mechanical surface are used to control an aircraft in a fluid medium. Persons skilled in the art, upon reviewing the entirety of this disclosure, will be aware of various mechanical linkages that may be used as a control surface as used and described in this disclosure.

Continuing in reference to FIG. 1, actuator may be mechanically connected to a control surface at a first end and mechanically connected to an aircraft at a second end. Being "mechanically connected," as used in this disclosure, means that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling may be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft.

Continuing in reference to FIG. 1, system 100 includes a plurality of controller area network gateways communicatively connected to the plurality of physical controller area network buses, wherein the plurality of controller area network gateways are configured to transmit the plurality of measured state data 108. A "controller area network gateway," as used in this disclosure, is a piece of networking hardware used for transmission of data signals from one discrete network to another. CAN gateway 112 may include routers and/or switches which may provide interoperability between physical CAN bus units 104 communicatively connected with aircraft and switches, such as Ethernet switches, wherein the intraoperatively may include the transmission of measured state data 108 between the aircraft and the Ethernet switch. CAN gateway 112 may include internet protocol (IP) network gateways, internet-to-orbit gateways, cloud storage gateways, internet-of-things (IoT) gateways, network switch, among other devices which provide interoperability between aircraft physical CAN bus units 104 and virtual machines, computing devices, and the like. In an embodiment, and without limitation, CAN gateway 112 may include a virtual CAN gateway, wherein the CAN gateway is implemented as a software package and/or housed remotely in a data center, data store, the cloud, a separate server and/or computing device, and the like.

Continuing in reference to FIG. 1, system 100 includes at least a network switch communicatively connected to the plurality of controller area network gateways configured to receive the transmitted measured state data and transmit the measured state data via a transmission signal. A "network switch," as used in this disclosure, is a networking hardware that connects devices on a computer network using packet switching to receive and forward data to a destination device. A network switch 116 may include an Ethernet hub switch, which may be used for Fiber Channel, Asynchronous Transfer Modes, and/or InfiniBand. A "transmission signal," as used in this disclosure, is a transmitted analogue and/or digital signal originated from physical CAN bus unit 104. Transmission signal may include measured state data 108. In an embodiment and without limitation, network switch 116 may include a virtual network switch, wherein the network switch is implemented as a software package and/or housed remotely in a data center data store, the cloud, a separate server and/or computing device, and the like. Further, in a non-limiting embodiment, CAN gateway 112 and network switch 116 and/or virtual CAN gateway 112 and virtual network switch 116 may be combined into one device, such that there is one component and/or virtual system comprising both component.

Continuing in reference to FIG. 1, transmission signal may include Ethernet transmission signal. An "Ethernet transmission signal," as used in this disclosure, is an analogue and/or digital signal transmitted using functionality of the Ethernet family of computer network standards. Ethernet transmission signal 120 may be generated by and/or from network switch 116, wherein signals received by network switch 116 from CAN gateway 112 may be transmitted as an Ethernet transmission signal 120 from network switch 116; transmission may include multiplexing, for instance and without limitation by way of a multiplexor, and/or selection by some logic at network switch 116. Network switch 116 may include a physical layer defining the electrical and/or optical properties of the physical connection between a device, such as a CAN gateway 112, and a network. A transmission signal of a measured state data originating from physical CAN bus unit 104 located at aircraft may be transmitted to a virtual CAN bus, and/or virtual CAN bus unit, as described in further detail below, as an Ethernet-transmissible signal. Measured state data relating to a variety of flight information concerning aircraft may be signaled to a virtual bus via a wireless, wired, optical, or other connection, and/or an Ethernet connection; virtual bus unit may correspondingly transmit back to physical CAN bus unit 104 back through network switch 116 using any such media of transmission. Transmitting back may include, for instance and without limitation, transmitting a control message to remotely alter a state of aircraft, as described in further detail below.

Continuing in reference to FIG. 1, transmission signal may include radio frequency transmission signal. A "radio frequency transmission signal," as used in this disclosure, is an alternating electric current or voltage or of a magnetic, electric, or electromagnetic field or mechanical system in the frequency range from approximately 20 kHz to approximately 300 GHz. Radio frequency (RF) transmission signal 124 may compose analogue and/or digital signal received, from instance via the network gateway 116 and transmitted using functionality of output power of radio frequency from a transmitter to an antenna, and/or any RF receiver. RF transmission signal 124 may use longwave transmitter device for transmission of signals. RF transmission signal 124 may include a variety of frequency ranges, wavelength ranges, ITU designations, and IEEE bands including HF, VHF, UHF, L, S, C, X, Ku, K, Ka, V, W, mm, among others. Radio frequency transmission signal 124 may be generated by and/or from network switch 116. Signals received by network switch 116 from CAN gateway 112 may be transmitted, for instance and without limitation as multiplexed by way of a multiplexor and/or selected by some logic at network switch 116, as a radio frequency transmission signal 120 from network switch 116. Network switch 116 may include a physical layer defining electrical and/or optical properties of a physical connection between a device, such as a CAN gateway 112, and a communication device such as without limitation a radiating antenna used to convert a time-varying electric current into an electromagnetic wave or field. In a non-limiting example, transmission signal of measured state data originating from physical CAN bus unit 104 may be transmitted to a virtual CAN bus, and/or virtual CAN bus unit, as a radio wave-transmissible signal. Measured state data relating to a variety of flight information concerning an aircraft may be signaled to a virtual bus via a transmitting antenna and/or encoder and received by a receiving antenna and/or receiver at bus unit; transmission may be relayed by one or more intervening devices such as network hubs and/or nodes, satellites, or the like. Radio frequency signal transmission may be sent to a virtual bus unit and the virtual bus unit may correspondingly transmit back to physical CAN bus unit 104 through network switch 116. Transmitting back may include, for instance and without limitation, transmitting a control message to remotely alter a state of an aircraft, as described in further detail below.

Continuing in reference to FIG. 1, at least a network switch 116 may be further configured to multiplex the plurality of measured state data 108 messages from the plurality of physical CAN bus units 104 into a single incoming transmission signal. A "single incoming transmission signal," as used in this disclosure, is a multiplexed transmission signal including a plurality of measured state data 108 transmission signals originating from physical CAN bus units 104. Single transmission signal 128 may include a plurality of Ethernet transmission signals 120 from a plurality of network gateways 116. Single transmission signal 128 may include a plurality of RF transmission signals 124 from a plurality of network gateways 116.

Multiplexing may include any method by which multiple analogue and/or digital signals are combined into one signal over a shared medium. For instance and without limitation, multiplexing may include receiving a plurality of inputs and choosing, or selecting, which input to send as an output from a multiplexor based on control inputs to the multiplexor. Multiplexing may include analogue modulation, such as amplitude modulation (AM), frequency modulation (FM), phase modulation (PM), quadrature amplitude modulation (QAM), space modulation (SM), single-sideband modulation (SSB), and the like. Multiplexing may include circuit mode modulation, including time-division multiplexing (TDM), frequency-division multiplexing (FDM), wavelength-division multiplexing (WDM), space-division multiple access (SDMA), polarization-division multiplexing (PDM), spatial multiplexing, and the like. Multiplexing may include statistical multiplexing, including packet switching, dynamic time-division multiple access (TDMA), frequency-hopping spread spectrum (FHSS), and the like. Multiplexing may be performed by a multiplexer such as any programmable logic device which selects between several analog and/or digital input signals (measured state data 108) and forwards the selected inputs to a single output line (transmitted from network switch 116). Network switch 116 may include multiplexor and/or may act as a multiplexer for receiving, for instance and without limitation, multiple Ethernet-based transmission signals and package the transmission into a single output to transmit via Ethernet transmission to a virtual CAN bus.

Continuing in reference to FIG. 1, system 100 includes at least a virtual controller area network bus unit configured to receive the transmission signal originating from the at least a network switch. A "virtual controller area network bus unit," as used in this disclosure, is a device including a central processing unit (CPU), CAN controller, and transceiver, which receives transmission signal 120 and virtually recapitulate the status, behavior, and/or data of and/or originating from physical CAN bus unit 104. Virtual CAN bus unit 132 may include any physical circuit elements suitable for use in physical CAN bus unit as described above. Virtual CAN bus unit 132 may include a multiplexor, multiplexing logic, and/or multiplex electrical wiring for transmission of multiplexed signaling to network switch 116. Virtual CAN bus unit 132 may include message-based protocol(s), wherein the invoking program sends a message to a process and relies on that process and its supporting infrastructure to then select and run appropriate programing. Virtual CAN bus unit 132 may include a computing device, as described in further detail below. Virtual CAN bus unit 132 may include a computer, "smartphone", IoT device, tablet computer, among other devices with capability described herein. Virtual CAN bus unit 132 may receive transmission signal 120 including measured state data 108. Virtual CAN bus unit 132 may receive transmission signal 120 as Ethernet transmission signal 124 and/or RF transmission signal 128. Virtual CAN bus unit 132 may include a virtual machine, which operates as an emulation of a computer system, providing functionality of a physical computer. Virtual CAN bus unit 132 may include any device herein configured to demultiplex signal, store to disc, transmit signals to other device, and/or send back to flight CAN(s).

Continuing in reference to FIG. 1, virtual CAN bus unit 132 may be configured to demultiplex the single incoming transmission signal 128 into a plurality of outgoing messages originating from the plurality of physical controller area network buses. An "outgoing message," as used in this disclosure, is a demultiplexed transmission signal which originated as part of the single incoming transmission signal. Outgoing message may include a plurality of measured state data 108, and/or discrete portions thereof. Outgoing message may include analogue and/or digital transmission signals, including Ethernet transmission signal 120 and/or RF transmission signal 124.

Demultiplexing is a process of reconverting the single transmission signal 128 containing the multiple analogue and/or digital signal streams from the plurality of network gateways 116 back into the original separate and unrelated signals originally relayed from physical CAN bus units 104. Demultiplexing may include extracting the original channels on the receiving end to identify which physical CAN bus unit 104 a signal originates from. Demultiplexing may be performed using a demultiplexer such as a binary decoder, or any programmable logic device. Demultiplexing may be performed using a computing software operating on the virtual CAN bus unit 132, which may deconvolute the single transmission signal 128. Alternatively or additionally, virtual CAN bus unit 132 may be configured to communicatively connect to each controller area network gateway of the plurality of controller area network gateways. Virtual CAN bus unit 132 may receive signal transduction directly from CAN network gateways 116, circumventing the need for multiplexing.

Continuing in reference to FIG. 1, virtual CAN bus unit 132 may be configured to bridge a plurality of virtual controller area network bus units to the plurality of physical controller area network bus units 104. A "plurality of virtual controller area network bus units," as used in this disclosure, is at least a second virtual CAN bus unit aside from a first virtual CAN bus unit 132 which originally received the single transmission signal 128. Plurality of virtual controller area network bus units may include any capability as described for virtual CAN bus unit 132 herein. A network bridge may include a computer networking device (virtual CAN bus unit 132) that creates a single, aggregate network from multiple communication networks or network segments (plurality of virtual CAN buses). Network bridging is distinct from routing. Routing may allow multiple networks to communicate independently and yet remain separate, whereas bridging may connect two separate networks as if they were a single network. In this way, virtual CAN bus unit 132 may transmit the demultiplexed outgoing messages to a plurality of virtual CAN bus unit 132 which may operate as if they were all part of the same virtual machine. Bridging may include any type of network bridging technology, such as simple bridging, multiport bridging, and learning or transparent bridging. Virtual CAN bus unit 132 may perform bridging using a forwarding information base stored in content-addressable memory (CAM), wherein for each received ethernet frame, the virtual CAN bus unit 132 may learn from the frame's source MAC address and add this together with an interface identifier to the forwarding information base. The virtual CAN bus unit 132 may then forward the frame to the interface found in the CAM based on the frame's destination MAC address. If the destination address is unknown the switch sends the frame out on all interfaces (except the ingress interface). This process is oftentimes referred to unicast flooding. Once a bridge learns the addresses of its connected nodes, it may forward data link layer frames using a layer-2 forwarding method. There are several forwarding methods a bridge can use, for instance and without limitation, store and forward, cut through, fragment free, and adaptive switching, of which some methods are performance-increasing methods when used on "switch" products with the same input and output port bandwidths.

Continuing in reference to FIG. 1, bridging may include using any device that is capable for communicating with virtual CAN bus unit 132, computing device, or able to receive data, retrieve data, store data, and/or transmit data, for instance via a data network technology such as 3G, 4G/LTE, 5G, Wi-Fi, IEEE 802.11 family standards, IEEE 802.1aq standards, and the like. For instance and without limitation, Shortest Path Bridging (SPB), specified in the IEEE 802.1aq standard, is a computer networking technology intended to simplify the creation and configuration of networks, while enabling multipath routing. It may include a proposed replacement for Spanning Tree Protocol (SPB) which blocks any redundant paths that could result in a layer 2 loop. SPB may allow all paths to be active with multiple equal-cost paths. SPB may also increase the number of VLANs allowed on a layer-2 network. Bridging between devices may also include devices that communicate using other mobile communication technologies, or any combination thereof, for instance and without limitation, short-range wireless communication for instance, using Bluetooth and/or Bluetooth LE standards, AirDrop, near-field (NFC), and the like. Bridging between devices may be performed using any wired, optical, or wireless electromagnetic transmission medium, as described herein.

Continuing in reference to FIG. 1, bridging the plurality of virtual controller area network bus units to the plurality of physical CAN bus units 104 may include transmitting at least a control message of a plurality of control messages originating from at least a virtual controller network bus of the plurality of virtual controller network buses to at least a physical CAN bus unit 104 of the plurality of physical CAN bus units 104. A "control message," as used in this disclosure, is a transmission signal that is intended to control a device that is considered at a physical CAN bus and/or communicated therewith. 136 may include an output message originating from virtual CAN bus unit 132 for modulating an aspect of flight control via a device communicatively connected to a physical CAN bus unit 104. Control message 136 may enable a virtual machine, such as virtual CAN bus unit 132, computing device, and/or any device described herein, to propagate a transmission targeted to a particular physical CAN bus unit 104 to effect, actuate, and/or modulate an aircraft mechanism. Control message 136 may include transmission signal to alter fly-by-wire control, flight control, thrust, angular velocity, climb, altitude, pitch, yaw, roll, acceleration, braking, landing gear mechanism, among other flight controls. Control message 136 may include analogue or digital transmission signals intended to be displayed to and/or for a pilot operating aircraft. Control message 136 may include digital messages intended to be displayed via a heads-up device (HUD), touch screen, computer, or other digital messaging intended to be displayed in the aircraft. Control message 136 may include transmitted signals intended to operate a payload associated with aircraft, for instance for releasing a mechanism for dropping a cargo load. Control message 136 may be propagated and transmitted from virtual buses using an analogue and/or digital signal via a wired, optical, and/or wireless electromagnetic medium (such as via an Ethernet connection, radio frequency, or any other electromagnetic signal transmission).

Continuing in reference to FIG. 1, bridging performed by virtual CAN bus unit 132 may include transmitting at least a control message 136 to control the one or more actuators communicatively connected to the aircraft. As described herein, actuators may receive signals, such as control message 136, for controlling a device communicatively connected with aircraft. Control message 136, for instance and without limitation, may signal actuator to control thruster controls, landing gear, inceptor, throttle, collective, cyclic, impeller, alerion, rotors, motor, flight display, gyroscope, accelerometer, sensor/sensor suite, fault detection system, inertial measure unit (IMU), power management system, air conditioning/heat, among other flight controls, displays, and/or devices. Control message 136 may be received by all physical CAN bus units 104 demultiplexed and bridged to virtual buses. Control message 136 may originate from any device which is bridged via virtual CAN bus unit 132.

Figure 2:
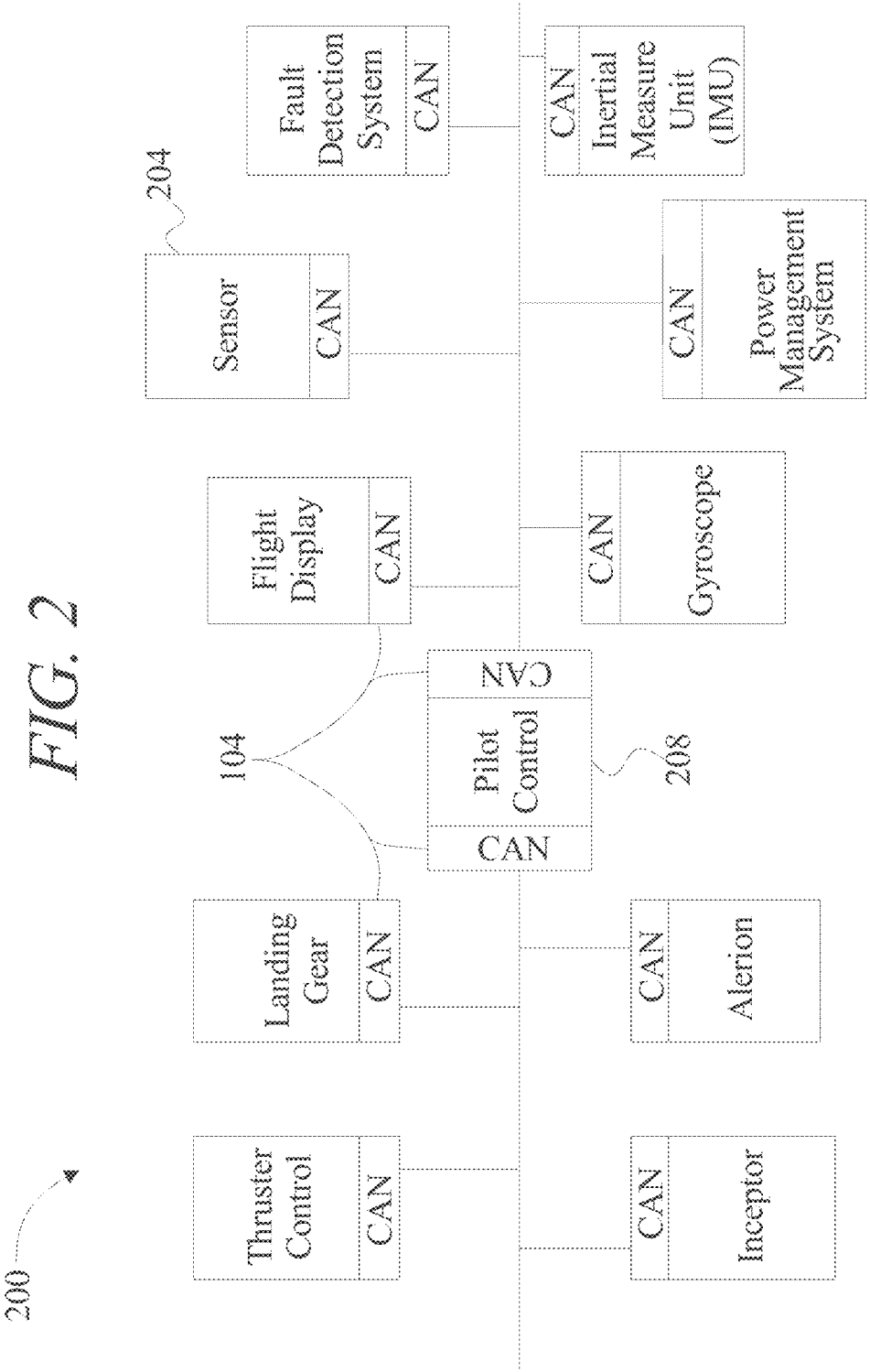
FIG. 2 is a diagrammatic representation illustrating a plurality of physical controller area network buses.

Referring now to FIG. 2, a non-limiting exemplary embodiment 200 of a plurality of physical controller area network buses 104 are illustrated. CAN may be used to prevent the need for large, multi-core wiring harnesses used in eVTOL aircraft. CAN bus speed my may reach 1 Mbit/sec, which may be achieved with a bus length of up to 40 meters when using a twisted wire pair. The bus must be terminated at each end, typically using a resistor of 120 Ohms. For bus lengths longer than 40 meters the bus speed must be reduced, for instance, 1000 meter bus may be achieved with a 50 Kbit/sec bus speed. Aircraft may include a plurality of sensors that connect with physical CAN bus units 104 layers to transmit measured state data 104. For instance and without limitation physical CAN bus units 104 may transmit measured state data 108 from at least a sensor 204 communicatively connected to at least a pilot control 208. Measured state date 108 originating from sensor may include electrical, electromagnetic, visual, audio, radio waves, or another undisclosed signal type alone or in combination. At least a sensor 204 communicatively connected to at least a pilot control 208 may include a sensor disposed on, near, around or within at least pilot control 208. At least a sensor 204 may include a motion sensor. A "motion sensor", for the purposes of this disclosure, is a device or component configured to detect physical movement of an object or grouping of objects. One of ordinary skill in the art would appreciate, after reviewing the entirety of this disclosure, that motion may include a plurality of types including and not limited to: spinning, rotating, oscillating, gyrating, jumping, sliding, reciprocating, or the like. At least a sensor 204 may include, torque sensor, gyroscope, accelerometer, torque sensor, magnetometer, inertial measurement unit (IMU), pressure sensor, force sensor, proximity sensor, displacement sensor, vibration sensor, Hall sensor, among others.

Still referring to FIG. 2, sensor 204 may include a sensor suite which may include a plurality of sensors 204 that may detect similar or unique phenomena. For example, in a non-limiting embodiments, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors 204 may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor 204 is configured to detect pilot input from at least pilot control 208. At least pilot control 208 may include a throttle lever, inceptor stick, collective pitch control, steering wheel, brake pedals, pedal controls, toggles, joystick.

Continuing in reference to FIG. 2, sensor 204 may be configured to receive a Control message 136. Control message 136 for sensor 204 may include a command datum. A "command datum", as used in this disclosure, refers an electronic signal representing at least an element of data correlated to a desired change in aircraft conditions as described in the entirety of this disclosure. At least pilot control 208 may be communicatively connected to any other component presented in system, the communicative connection may include redundant connections configured to safeguard against single-point failure. Control message 136 may signal a change to the heading or trim of an electric aircraft. Control message 136 may signal a change to an aircraft's pitch, roll, yaw, or throttle. Control message 136, when referring to throttle, may refer to a signal to increase or decrease thrust produced by at least a propulsor. Control message 136 may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, and/or pulse width modulated signal, among others. At least a sensor 204 may include circuitry, computing devices, electronic components, such as CAN, or a combination of elements, that translates control message 136 into at least an electronic signal command datum configured to be control an electronic component.

Figure 3:
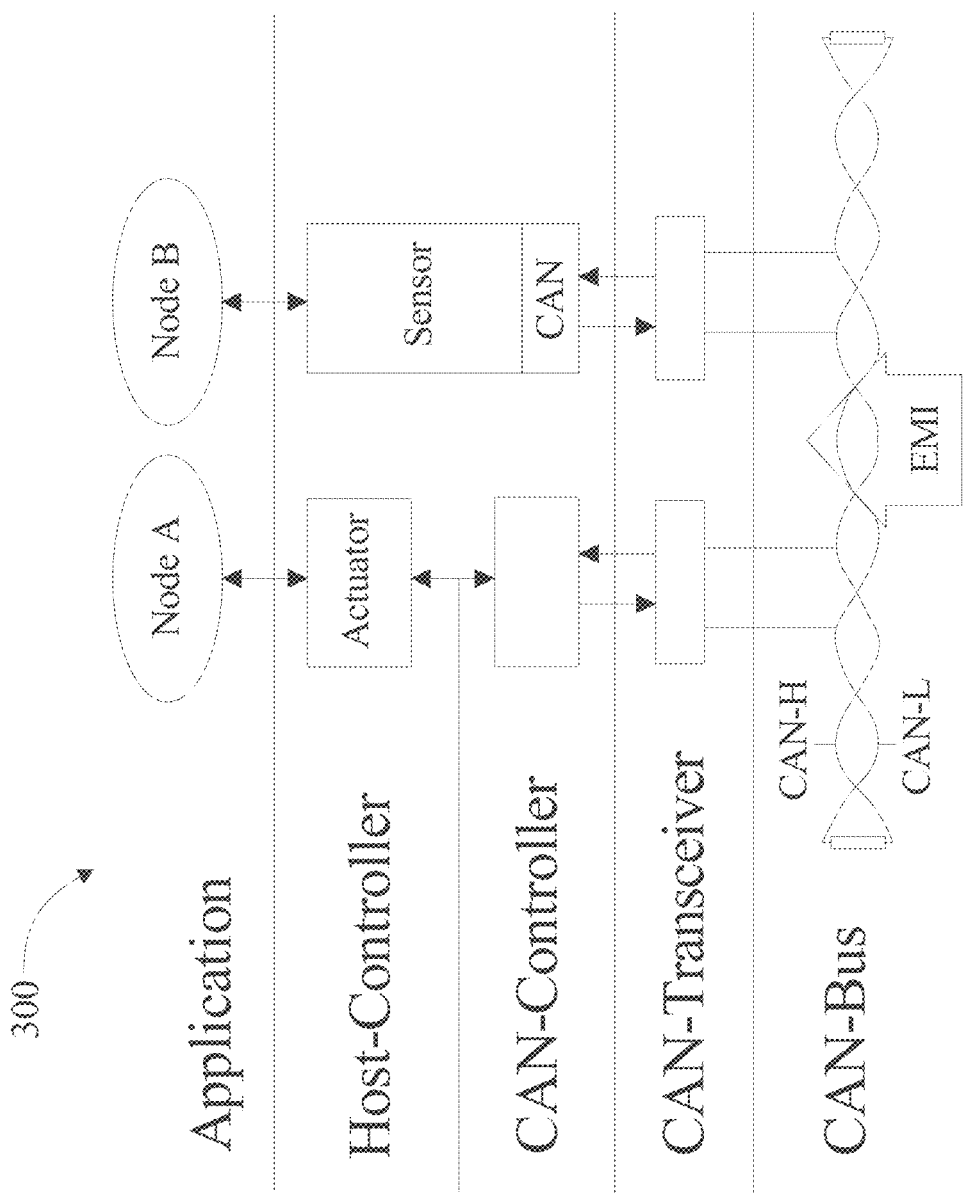
FIG. 3 is a diagrammatic representation illustrating a transmission signal from a controller area network.

Referring now to FIG. 3, a non-limiting exemplary embodiment 300 of a CAN bus architecture and resultant transmission signal is illustrated. The CAN bus may include a balanced (differential) 2-wire interface running over either a Shielded Twisted Pair (STP), Un-shielded Twisted Pair (UTP), or Ribbon cable. Each node may use a male 9-pin D connector. The CAN protocol, which may perform on the physical CAN bus unit 104 including a CPU, controller, and/or transceiver, may use Non-Return-to-Zero, or NRZ, bit coding for signal transmission. This means that the signal is constant for one whole bit time and only one time segment is needed to represent one bit. The two bus conductors may be simply referred to as "CAN H" and "CAN L", although the conductors may be driven differentially in balanced mode, the levels are shifted, resulting in a waveform that differs. NRZ encoding (with bit-stuffing) for data communication may rely on a differential two wire bus. The use of NRZ encoding ensures compact messages with a minimum number of transitions and high resilience to external disturbance.

Figure 4:
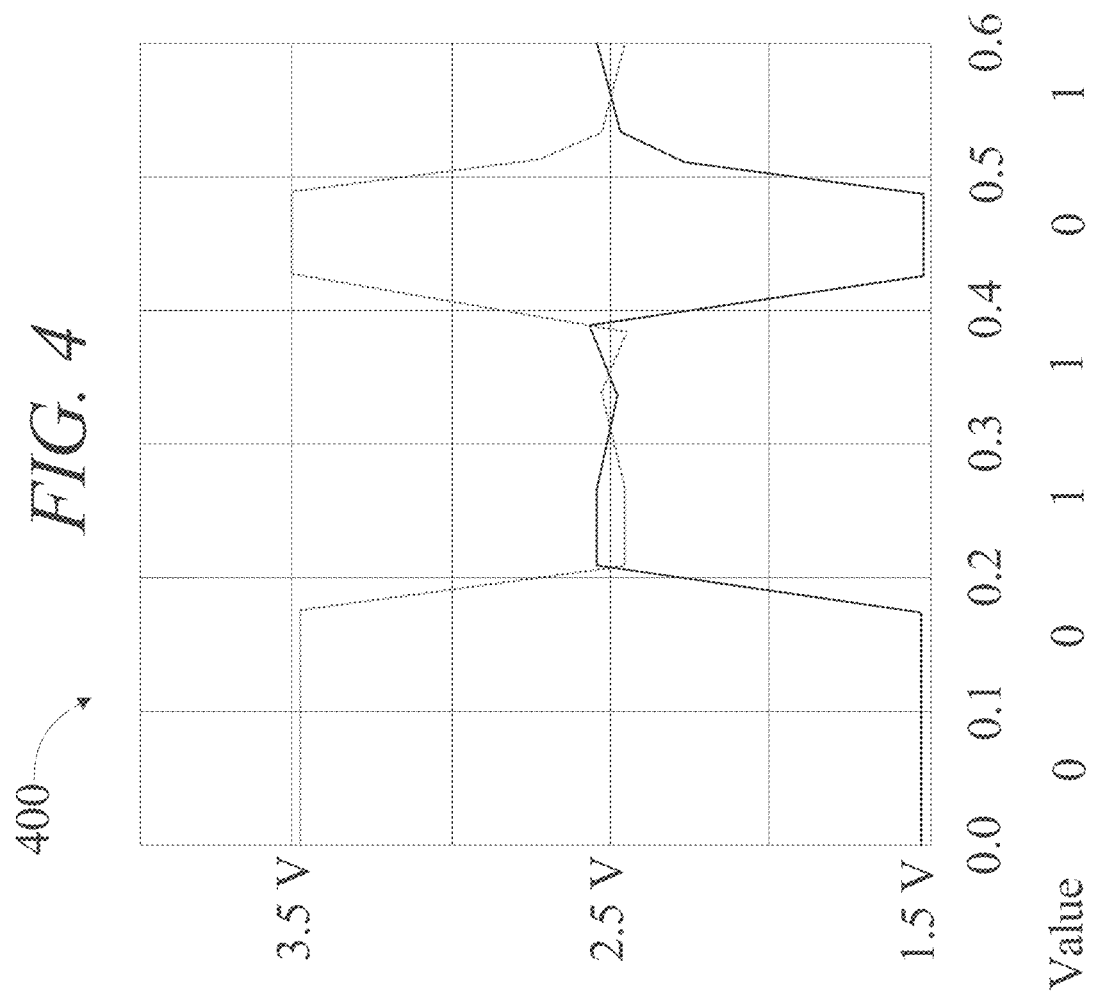
FIG. 4 is a graphical representation illustrating a controller area network signal transduction.

Referring now to FIG. 4, a non-limiting exemplary embodiment 400 of controller area network signal transduction is illustrated. CAN signaling may be represented in 1 and 0 binary sequence wherein the logic refers to 1 (recessive) where no signal is sent (logic 0 wins). For instance, transceiver output at CAN L may float upwards from 1.5 V to 2.5V, and transceiver output at CAN H may float downwards from 3.5 V to 2.5V; in other words, there may be no voltage difference, and/or a negligible voltage difference, between CAN L and CAN H. In such an example, the voltage between the two CAN L and CAN H centers at 2.5 V, which may correspond to either a '0' binary value (bit), or alternatively a '1' binary value. Logic 0 (dominant) may force bus to a zero level, for instance, transceiver output at CAN L may be driven back to 1.5V (or kept at a nominal 1.5 V value), and transceiver output at CAN H may be driven back to 3.5V (or kept at a nominal 3.5 V value) (i.e. there is a 2V voltage difference). Voltage may be read, collected, and/or measured at time intervals of 0.1 microseconds (µs), wherein value relates to the logic bit (0 or 1) that results form each 0.1 µs period. As shown in FIG. 4, an example waveform showing transmission of the sequence {001101} is illustrated. Vertical axis is volts, horizontal axis is microseconds. Alternatively or additionally, a logic level, or finite number of states a digital signal can inhabit, may be represented by any difference in voltage between a signal and a ground. For example, CAN L may be kept at a ground state of 0 V and CAN H may be kept at a nominal 0 V state, where a difference in voltage between the two equals 0 (i.e. no deviation from ground state) and a binary value is transmitted as '0'. Correspondingly, if CAN H voltage rises above 0 V, for instance to 1.5 V, (i.e. a difference in voltage between the two is detected), then the binary value may be transmitted as '1'. Differences in voltage may be sampled at any suitable time point, such as microsecond time scale as depicted in FIG. 4.

Continuing in reference to FIG. 4, a plurality of physical CAN bus units 104 may transmit measured state data 108 to a plurality of network gateways 112 using synchronous transmission. Synchronous transmission may be used (for instance with bit stuffing) to ensure transparent synchronization of all bus nodes. When transmitting, the sender may observe the sequence of bit values being sent. In non-limiting exemplary embodiments, a maximum of five consecutive bits may be allowed to have the same polarity, this may remove contiguous series of identical values on the bus. Whenever five consecutive bits of the same polarity may have been transmitted, the transmitter may insert one additional bit of the opposite polarity into the bit stream before transmitting further bits. The receiver may check the number of bits with the same polarity and may remove the 'stuff bits' from the bit stream. This may be referred to as "destuffing". Hence, the sequence '0111111' becomes '01111101' on the wire, but the receiver may correctly receive '0111111'. The rule dictates also that the '0111110' may become '01111100' on the wire, but the receiver may then receive '0111110', since the receiver may automatically remove any bit after 5 consecutive bits. The removed stuffing bit must be the opposite polarity (or noted as an error). This may happen automatically and may ensures receivers always see transitions. It may add up to one bit in five, maximum 20% additional overhead. Alternatively or additionally, CAN bus may use an asynchronous transmission scheme controlled by start and stop bits at the beginning and end of each character. This interface may be used, employing serial binary interchange. Information may be passed from transmitters to receivers in a data frame. The data frame may be composed of an Arbitration field, Control field, Data field, CRC field, ACK field, among others. The frame may begin with a 'Start of frame' [SOF] and may end with an 'End of frame' [EOF] space, and in this way, the data field may be from 0 to 8 bytes. With such a system, two sets of 'checks' may be employed to assay the integrity of the transmission signals: at the message level: Cyclic Redundancy Checks (CRC), Frame Checks, Acknowledgment Error Checks, among others; and at the bit level: Bit Monitoring, Bit Stuffing, Parity Check, and the like.

Figure 5:
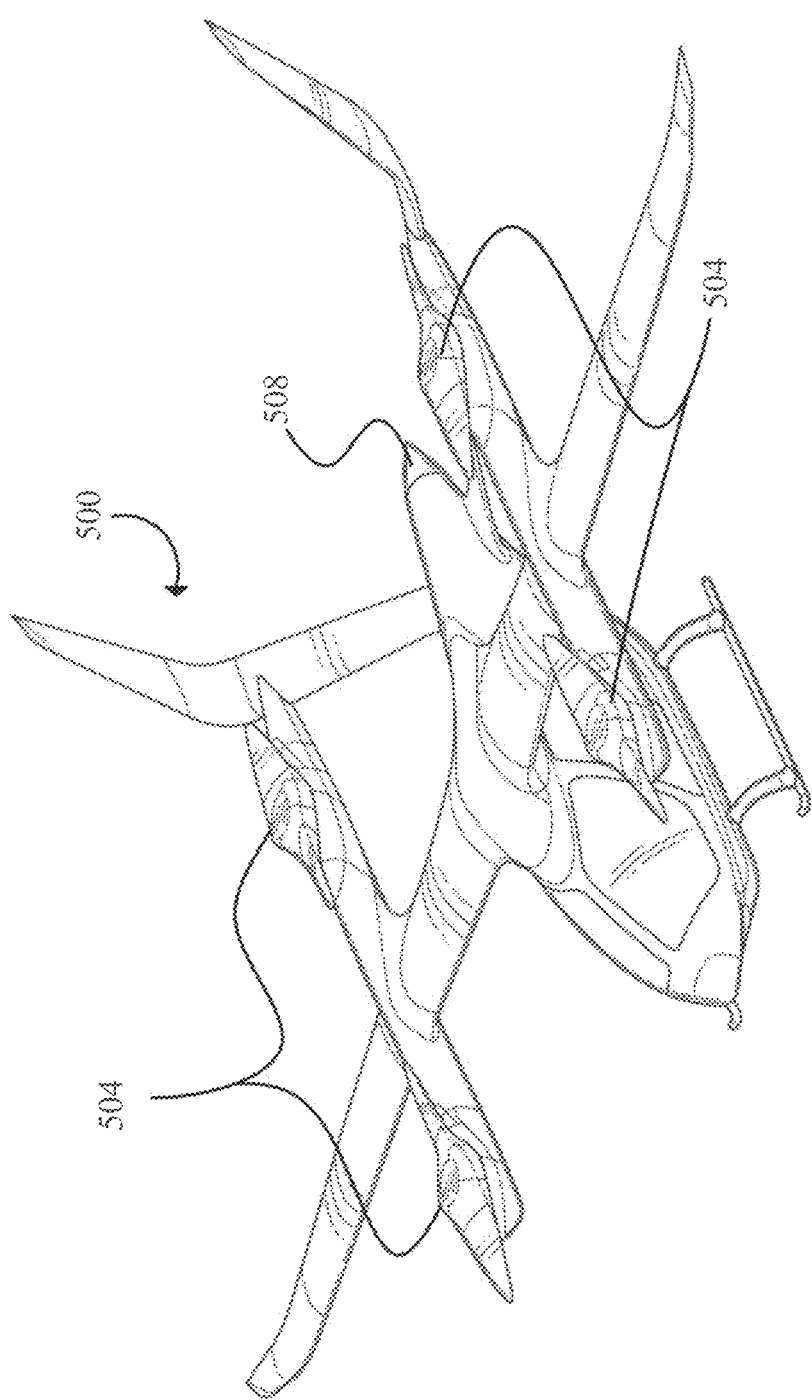
FIG. 5 is a diagrammatic representation of an electric aircraft.

Referring now to FIG. 5, an embodiment of an electric aircraft 500 is illustrated. The aircraft used with the system and method described herein may include an electric aircraft 500. Electric aircraft 500 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources, to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors connected with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 5, a number of aerodynamic forces may act upon the electric aircraft 500 during flight. Forces acting on an electric aircraft 500 during flight may include, without limitation, thrust, the forward force produced by the rotating element of the electric aircraft 500 and acts parallel to the longitudinal axis. Another force acting upon electric aircraft 500 may be, without limitation, drag, which may be defined as a rearward retarding force which is caused by disruption of airflow by any protruding surface of the electric aircraft 500 such as, without limitation, the wing, rotor, and fuselage. Drag may oppose thrust and acts rearward parallel to the relative wind. A further force acting upon electric aircraft 500 may include, without limitation, weight, which may include a combined load of the electric aircraft 500 itself, crew, payload, and/or fuel. Weight may pull electric aircraft 500 downward due to the force of gravity. An additional force acting on electric aircraft 500 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, electric aircraft 500 are designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Referring still to FIG. 5, Aircraft may include at least a vertical propulsor 504 and at least a forward propulsor 508. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 504 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

Continuing in reference to FIG. 5, at least a forward propulsor 508 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 504 and at least a forward propulsor 508 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically connected to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varied, or reversing, voltage levels such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

Continuing in reference to FIG. 5, during flight, a number of aerodynamic forces may act upon the electric aircraft.

Forces acting on an aircraft 500 during flight may include thrust, the forward force produced by the rotating element of the aircraft 500 and acts parallel to the longitudinal axis. Drag may be defined as a rearward retarding force which is caused by disruption of airflow by any protruding surface of the aircraft 500 such as, without limitation, the wing, rotor, and fuselage. Drag may oppose thrust and acts rearward parallel to the relative wind. Another force acting on aircraft 500 may include weight, which may include a combined load of the aircraft 500 itself, crew, payload, and/or fuel. Weight may pull aircraft 500 downward due to the force of gravity. An additional force acting on aircraft 500 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil. For example, and without limitation, electric aircraft 500 may be designed to be as lightweight as possible. Reducing the weight of the aircraft and designing to reduce the number of components is essential to optimize the weight. To save energy, it may be useful to reduce weight of components of an electric aircraft 500, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on electric aircraft 500 and/or propulsors.

Figure 6:
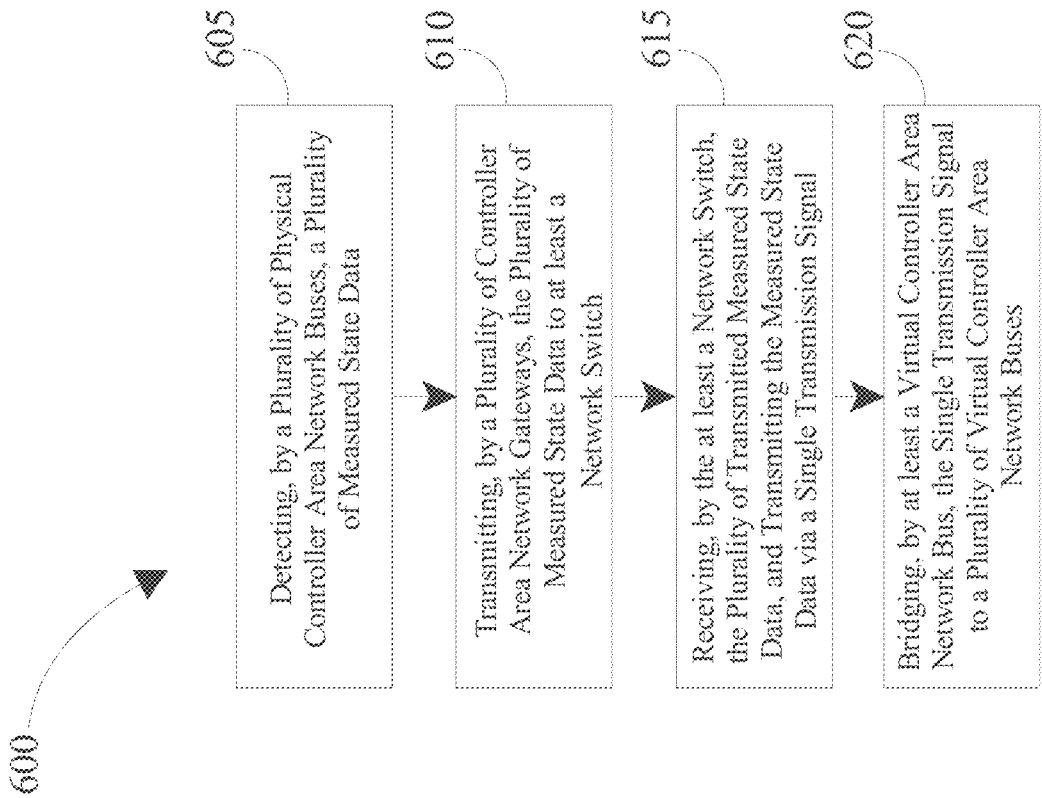
FIG. 6 is a flow diagram of an exemplary workflow illustrating a method for virtualizing a plurality of controller area network bus units communicatively connected to an aircraft.

Referring now to FIG. 6, a method 600 for virtualizing a plurality of controller area network bus units communicatively connected to an aircraft is illustrated. At step 605, method includes detecting, by a plurality of physical controller area network bus units 104 wherein each physical controller area network bus unit 104 comprises a central processing unit, controller area network controller, and a transceiver, communicatively connected to the aircraft 500, a measured state datum 108 of a plurality of measured state data 108, wherein each physical controller area network bus unit 104 is configured to transmit the plurality of measured state data 108 to a plurality of controller area network gateways 112. Aircraft 500 may include an electric aircraft. Measured state data 108 may include a plurality of data signals detailing a control to one or more actuators communicatively connected to the aircraft 500; this may be implemented, without limitation, as described above in FIGS. 1-5.

Still referring to FIG. 6, at step 610, method includes transmitting the plurality of measured state data 108 by the plurality of controller area network gateways 112 communicatively connected to the plurality of physical controller area network buses 104, wherein the plurality of controller area network gateways 112 are configured to transmit the plurality of measured state data 108 to at least a network switch 116. Transmitting the plurality of measured state data 108 may include transmitting an Ethernet transmission signal 120. Transmitting the plurality of measured state data further comprises transmitting a radio frequency transmission signal 124; this may be implemented, without limitation, as described above in FIGS. 1-5.

Continuing in reference to FIG. 6, at step 615, method includes receiving the plurality of transmitted measured state data 108 by the at least a network switch 116 communicatively connected to the plurality of controller area network gateways 112, wherein the network switch 116 is configured to transmit the measured state data 108 via a single transmission signal 128. The at least a network switch 116 may be further configured to multiplex the plurality of measured state data 108 messages from the plurality of physical controller area network buses 104 into the single incoming transmission signal 128; this may be implemented, without limitation, as described above in FIGS. 1-5.

Continuing in reference to FIG. 6, at step 620, method includes receiving the single transmission signal 128 originating from the at least a network switch 116 by at least a virtual controller area network bus unit 132, wherein the at least a virtual controller area network bus unit 132 is configured to bridge a plurality of virtual controller area network bus units. The at least a virtual controller area network bus unit 132 may be further configured to demultiplex the single incoming transmission signal 128 into a plurality of outgoing messages originating from the plurality of physical controller area network buses 104. The at least a virtual controller area network bus unit 132 may be further configured to bridge the plurality of virtual controller area network bus units to the plurality of physical controller area network buses 104. Bridging the plurality of virtual controller area network bus units to the plurality of physical controller area network buses may include transmitting at least a control message 136 of a plurality of control messages originating from at least a virtual controller network bus of the plurality of virtual controller network buses to at least a physical controller area network bus of the plurality of physical controller area network buses. Bridging may include transmitting the at least a control message 136 to control the one or more actuators communicatively connected to the aircraft 500; this may be implemented, without limitation, as described above in FIGS. 1-5.

Figure 7:
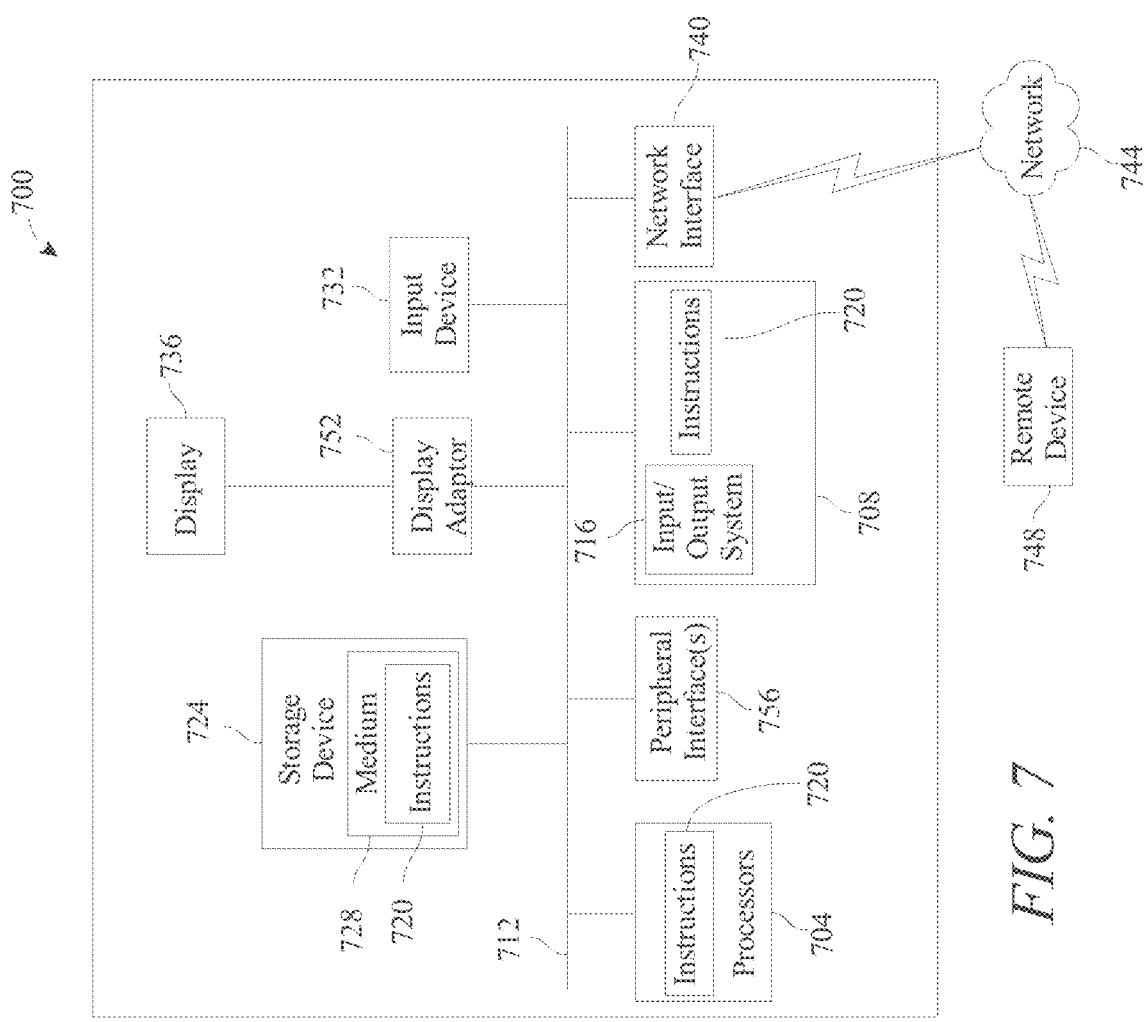
FIG. 7 is a block diagram of a computing system that can be used to implement any one or more of the methodologies disclosed herein and any one or more portions thereof.

Referring now to FIG. 7, an exemplary embodiment of a computing device 700 is illustrated. Virtual CAN bus unit 132 may include a computing device 700 which may include any computing device as described in this disclosure, including without limitation a microcontroller, microprocessor, digital signal processor (DSP) and/or system on a chip (SoC) as described in this disclosure. Computing device 700 may refer to physical CAN bus unit 104, CAN network gateways 112, network switch 116, among other devices operating within aircraft 500 such as flight controller, displays, and the like. Computing device 700 may include, be included in, and/or communicate with a mobile device such as a mobile telephone or smartphone. Computing device 700 may include a single computing device operating independently, or may include two or more computing device operating in concert, in parallel, sequentially or the like; two or more computing devices may be included together in a single computing device or in two or more computing devices. Computing device 700 may interface or communicate with one or more additional devices as described below in further detail via a network interface device. Network interface device may be utilized for connecting computing device 700 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 700 may include but is not limited to, for example, a computing device or cluster of computing devices in a first location and a second computing device or cluster of computing devices in a second location. Computing device 700 may include one or more computing devices dedicated to data storage, security, distribution of traffic for load balancing, and the like. Computing device 700 may distribute one or more computing tasks as described below across a plurality of computing devices of computing device, which may operate in parallel, in series, redundantly, or in any other manner used for distribution of tasks or memory between computing devices. Computing device 700 may be implemented using a "shared nothing" architecture in which data is cached at the worker, in an embodiment, this may enable scalability of system 100 and/or computing device.

With continued reference to FIG. 7, computing device 700 may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 700 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 7 shows a diagrammatic representation of one embodiment of a computing device in the exemplary form of a computing device 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computing device 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computing device 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computing device 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computing device 700 (e.g., via an external port connector (not shown)). Particularly, storage device 724 and an associated machine-readable medium 728 may provide nonvolatile and/or volatile storage of machine-readable instructions, data structures, program modules, and/or other data for computing device 700. In one example, software 720 may reside, completely or partially, within machine-readable medium 728. In another example, software 720 may reside, completely or partially, within processor 704.

Computing device 700 may also include an input device 732. In one example, a user of computing device 700 may enter commands and/or other information into computing device 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computing device 700 via storage device 724 (e.g., a removable disk drive, a flash drive, etc.) and/or network interface device 740. A network interface device, such as network interface device 740, may be utilized for connecting computing device 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computing device 700 via network interface device 740.

Computing device 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computing device 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for virtualizing a plurality of controller area network bus units communicatively connected to an aircraft, the system comprising:
 a plurality of physical controller area network bus units, wherein each physical controller area network bus unit of the plurality of physical controller area network bus units is communicatively connected to an aircraft, and wherein each physical controller area network bus unit is configured to:
  detect a measured state datum of a plurality of measured state data of the aircraft; and
  transmit the plurality of measured state data to at least a network switch;
the at least a network switch, wherein the at least a network switch is communicatively connected to the plurality of physical controller area network bus units, and wherein the at least a network switch is configured to:
  receive the plurality of measured state data from the plurality of physical controller area network bus units;
  generate a single transmission signal as a function of the plurality of measured state data; and
  transmit the single transmission signal to a computing device; and
the computing device, wherein the computing device comprises a plurality of virtual controller area network bus units, wherein the computing device is configured to:
  receive the transmission signal originating from the at least a network switch; and
  bridge each virtual controller area network bus unit of the plurality of virtual controller area network bus units.

2. The system of claim 1, wherein the aircraft is an electric aircraft.

3. The system of claim 1, wherein each physical controller area network bus unit of the plurality of physical controller area network bus unit comprises a central processing unit, controller area network controller, and a transceiver.

4. The system of claim 1, wherein the system further comprises a plurality of controller area network gateways communicatively connected to the plurality of physical controller area network bus units, wherein the plurality of controller area network gateways are configured to:
  receive the plurality of measured state data from each physical controller area network bus unit of the plurality of physical controller area network bus units; and
  transmit the plurality of measured state data to at least a network switch.

5. The system of claim 1, wherein the at least a network switch is at least a virtual network switch.

6. The system of claim 5, wherein each physical controller area network bus unit of the plurality of physical controller area network bus units is configured to transmit the plurality of measured state data to at least a virtual network switch as a function of a connection.

7. The system of claim 5, wherein the connection includes the electric aircraft connecting to an Ethernet signal.

8. The system of claim 5, wherein the connection includes the electric aircraft connecting to a radio frequency signal.

9. The system of claim 1, wherein generate a single transmission signal as a function of the plurality of measured state data is further configured to include multiplexing the plurality of measured state data messages from the plurality of physical controller area network bus units into the single transmission signal.

10. The system of claim 1, wherein the computing device is further configured to demultiplex the single transmission signal into a plurality of outgoing messages.

11. A method for virtualizing a plurality of controller area network bus units communicatively connected to an aircraft, the method comprising:
  detecting, by a plurality of physical controller area network bus units is communicatively connected to an aircraft, a measured state datum of a plurality of measured state data of the aircraft;
  transmitting, by the plurality of physical controller area network bus units, the plurality of measured state data to at least a network switch;
  receiving, by at least a network switch, the plurality of measured state data from the plurality of physical controller area network bus units;
  generating, by the at least a network switch, a single transmission signal as a function of the plurality of measured state data;
  transmitting, by the at least a network switch, the single transmission signal to a computing device;
  receiving, by a computing device, wherein the computing device comprises a plurality of virtual controller area network bus units, the transmission signal originating from the at least a network switch; and
  bridging, by the computing device, each virtual controller area network bus unit of the plurality of virtual controller area network bus units.

12. The method of claim 11, wherein the aircraft is an electric aircraft.

13. The method of claim 11, wherein each physical controller area network bus unit of the plurality of physical controller area network bus unit comprises a central processing unit, controller area network controller, and a transceiver.

14. The method of claim 11, wherein the method further comprises:
  receiving, by a plurality of controller area network gateways communicatively connected to the plurality of physical controller area network bus units, the plurality of measured state data from each physical controller area network bus unit of the plurality of physical controller area network bus units; and
  transmitting, by the plurality of controller area network gateways, the plurality of measured state data to at least a network switch.

15. The method of claim 11, wherein the at least a network switch is at least a virtual network switch.

16. The method of claim 15, wherein the method further comprises transmitting, by each physical controller area network bus unit of the plurality of physical controller area network bus units, the plurality of measured state data to at least a virtual network switch as a function of a connection.

17. The method of claim 15, wherein the connection includes the electric aircraft connecting to an Ethernet signal.

18. The method of claim 15, wherein the connection includes the electric aircraft connecting to a radio frequency signal.

19. The method of claim 11, wherein generate a single transmission signal as a function of the plurality of measured state data is further comprises multiplexing the plurality of measured state data messages from the plurality of physical controller area network bus units into the single transmission signal.

20. The method of claim 11, wherein the method further comprises demultiplexing, by the computing device, the single transmission signal into a plurality of outgoing messages.

* * * * *